(12) United States Patent
Kim

(10) Patent No.: US 11,868,962 B2
(45) Date of Patent: Jan. 9, 2024

(54) SYSTEMS AND METHODS FOR INVENTORY RESHUFFLING AND REBALANCING

(71) Applicant: COUPANG CORP., Seoul (KR)

(72) Inventor: Je Kim, Bellevue, WA (US)

(73) Assignee: Coupang Corp., Seoul (KR)

( * ) Notice: Subject to any disclaimer, the term of this patent is extended or adjusted under 35 U.S.C. 154(b) by 43 days.

(21) Appl. No.: 17/178,513

(22) Filed: Feb. 18, 2021

(65) Prior Publication Data

US 2022/0036307 A1 Feb. 3, 2022

Related U.S. Application Data

(63) Continuation of application No. 16/944,867, filed on Jul. 31, 2020, now Pat. No. 10,956,865.

(51) Int. Cl.
*G06Q 10/0875* (2023.01)
*G06Q 30/0601* (2023.01)

(52) U.S. Cl.
CPC ..... *G06Q 10/0875* (2013.01); *G06Q 30/0635* (2013.01)

(58) Field of Classification Search
CPC .............. G06Q 10/0875; G06Q 30/0635
See application file for complete search history.

(56) References Cited

U.S. PATENT DOCUMENTS

| 8,620,707 | B1 | 12/2013 | Belyi et al. |
| 9,213,953 | B1 | 12/2015 | Kassmann et al. |
| 9,805,402 | B1 | 10/2017 | Maurer et al. |
| 10,360,522 | B1 | 7/2019 | Leonard et al. |
| 2018/0218312 | A1 | 8/2018 | Smith et al. |
| 2020/0151667 | A1 | 5/2020 | Mangalassery Gregory et al. |

FOREIGN PATENT DOCUMENTS

| JP | 2012-128237 A | 7/2012 |
| JP | 2019-185600 A | 10/2019 |
| KR | 1020210035016 A | 3/2021 |

OTHER PUBLICATIONS

Extended European Search Report, dated Apr. 19, 2021, issued by the European Patent Office in corresponding European Patent Application No. 20217817.4-1222 (9 pages).
Examination Notice, dated Apr. 25, 2022, issued by the Hong Kong Patents Registry in corresponding Hong Kong Patent Application No. 22021030176.2 (8 pages).
Patent Certificate and Register for Korean Patent No. 10-2324229, registered Nov. 3, 2021, and issued in corresponding Korean Patent Application No. 10-2020-0178942 (31 pages).

(Continued)

*Primary Examiner* — A. Hunter Wilder
(74) *Attorney, Agent, or Firm* — FINNEGAN, HENDERSON, FARABOW, GARRETT & DUNNER LLP

(57) ABSTRACT

A computer-implemented system and method for automated inventory using data associated with stock keeping unit SKU and fulfillment centers (FC) to initialize a data structure comprising a plurality of nodes, determine a weight associated with each FC based on the capacity of each FC, assignment SKU to one or more FCs, perform a preliminary mapping for the plurality of FCs, determining whether to rebalance the preliminary mapping of the quantity, and rebalancing the preliminary mapping based on the weights associated with each FC, to promote maximum utilization of the network.

20 Claims, 10 Drawing Sheets

(56) References Cited

OTHER PUBLICATIONS

Office Action, dated Nov. 25, 2021, issued in corresponding Taiwanese Patent Application No. 109147131 (4 pages).
Notice of Allowance in counterpart Korean Patent Application No. 10-2021-0150021 dated Jan. 3, 2022 (4 pages).
International Search Report and Written Opinion in counterpart Application No. PCT/IB2021/050147, dated Apr. 27, 2021 (8 pgs.).
Office Action in Vietnamese Application No. 1-2021-02987 dated Mar. 3, 2023 (2 pages).
Further Examination Notice in Hong Kong Application No. 22021030176.2 dated Apr. 26, 2023 (8 pages).

login  Sign Up  Service center

Category | Cheese | ? | 🛒

My Orders  Shopping Cart all 'Cheese' (65,586)         Gift Cards filter

☐ Fast Delivery
☐ Imported Product 65,586 results for 'Cheese'
Related searches: Sliced cheese  baby cheese  cheddar cheese  string cheese  butter  pizza cheese  cream cheese  cheese stick  cubed cheese  parmesan cheese 6 per page category
All
Food
Silverware
Kitchen utensils
Home electronics digital
Household goods
　View more brands
　Local Milk
　Daily dairy
　Cattle and trees
View more scope
All stars
　4 or more
　3 or more
　2 or more
　1 or more

FREE Shipping
Sliced cheese, 18g, 100 pieces
(88 won per 10 g)
Morning (Thursday)

(1294)

Mozzarella cheese, 1kg, 2 pieces
🚀
(103 won per 10 g)
Tomorrow (Wed)

(285)

100 grams of cheddar sliced cheese, 18 grams, 100 pieces
(73 won per 10 g)
Morning (Thursday)

(862)

Grated Parmesan Cheese, 85g, 1 piece
🚀
(389 won per 10g)
Tomorrow (Wed)

(839)

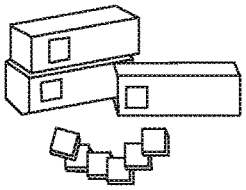

Mozzarella cheese, 1 kg, 1
(85 won per 10g)
Morning (Thursday)

(379)

FREE Shipping
1.36 kg of string cheese
Morning (Thursday)

SYSTEMS AND METHODS FOR INVENTORY RESHUFFLING AND REBALANCING

CROSS-REFERENCE TO RELATED APPLICATIONS

This application is a continuation of U.S. non-provisional application Ser. No. 16/944,867, filed on Jul. 31, 2020. The disclosure of the above-reference application is expressly incorporated herein by reference to its entirety.

TECHNICAL FIELD

The present disclosure generally relates to computerized methods and systems for optimizing inventory management. In particular, embodiments of the present disclosure relate to inventive and unconventional computerized systems that rebalance incoming product orders, based on information associated with product SKUs, among a system of distribution centers to maximize available distributive capacity while simultaneously maintaining various business requirements.

BACKGROUND

One major goal in the product delivery field is to minimize the time between when a product is purchased and when the product arrives at the purchaser. Distribution centers for said product, therefore, should be numerous in number and advantageously located close to the potential purchasers, with a set amount of the product in stock ready for shipping. Such distribution centers, or fulfillment centers (FCs), processes millions of products daily as by fulfilling consumer orders as soon as the orders are placed and enable shipping carriers to pick up shipments. Operations for managing inventory inside FCs may include receiving products from sellers, stocking the received products for easy picking access, packing the product, verifying the order, and delivering the product.

Although currently existing FCs and systems for inventory management in FCs are configured to handle large volumes of incoming and outgoing products, an issue arises when inventory of products are inefficiently distributed among the network of FCs. For example, there may be situations in which certain FCs are near capacity in terms of storage space or labor usage, while other FCs may have empty spaces or under-utilized labor.

To mitigate such problems, conventional inventory management systems require human intervention, that is for managers and workers to make ad hoc decisions to shift products, (i.e. rebalancing inventory) among the network of FCs, to either relieve congestion or better utilize capacity. Conventional methods are inefficient and labor intensive.

Therefore, there is a need for improved methods and systems for rebalancing the product inventory so that the network of FCs are fully utilized.

SUMMARY

One aspect of the present disclosure is directed to a computer-implemented system for automated inventory shuffling. The system comprises at least one processor; a memory comprising instructions that, when executed by the at least one processor, performs steps comprising: receive information comprising data regarding a network of a plurality of fulfillment centers (FCs), the data comprising a capacity of each FC; initialize a data structure comprising a plurality of nodes, the number of nodes equal to the number of FCs; determine, based on the capacity of each FC, a weight associated with each FC relative to the received FC capacities; receive, for assignment to one or more FCs, a product identifier associated with a product, the identifier associated with a quantity and a minimum order quantity; perform a preliminary mapping of the quantity to the plurality of FCs based on the associated minimum order quantity; based on the product identifier, determining whether to rebalance the preliminary mapping of the quantity, and if so, rebalancing the preliminary mapping based on the weights associated with each FC, to promote maximum utilization of the network; and forward instructions to a computer system to cause a received quantity to be delivered to the network based on the preliminary mapping.

Yet another aspect of the present disclosure is directed to a computer-implemented method for inventory shuffling. The method comprises steps comprising: receive information comprising data regarding a network of a plurality of fulfillment centers (FCs), the data comprising a capacity of each FC; initialize a data structure comprising a plurality of nodes, the number of nodes equal to the number of FCs; determine, based on the capacity of each FC, a weight associated with each FC relative to the received FC capacities; receive, for assignment to one or more FCs, a product identifier associated with a product, the identifier associated with a quantity and a minimum order quantity; perform a preliminary mapping of the quantity to the plurality of FCs based on the associated minimum order quantity; based on the product identifier, determining whether to rebalance the preliminary mapping of the quantity, and if so, rebalancing the preliminary mapping based on the weights associated with each FC, to promote maximum utilization of the network; and forward instructions to a computer system to cause a received quantity to be delivered to the network based on the preliminary.

Yet another aspect of the present disclosure is directed to a computer-implemented method for inventory shuffling, the method comprising: receive information comprising data regarding a network of a plurality of fulfillment centers (FCs), the data comprising an inbound capacity and a total capacity for each FC; initialize a data structure comprising a plurality of nodes, the number of nodes equal to the number of FCs; determine, based on a ratio of the inbound capacity and the total capacity, a utilization value each FC; receive, for assignment to one or more FCs, a product identifier associated with a product, the identifier associated with a quantity and a minimum order quantity; perform a preliminary mapping of the quantity to the plurality of FCs based on the associated minimum order quantity; based on the product identifier, determining whether to rebalance the preliminary mapping of the quantity, and if so, rebalancing the preliminary mapping based on the utilization value associated with each FC, to promote maximum utilization of the network; and forward instructions to a computer system to cause a received quantity to be delivered to the network based on the preliminary mapping.

BRIEF DESCRIPTION OF THE DRAWINGS

FIG. 1B depicts a sample Search Result Page (SRP) that includes one or more search results satisfying a search request along with interactive user interface elements, consistent with the disclosed embodiments.

DETAILED DESCRIPTION

Figure 1A:
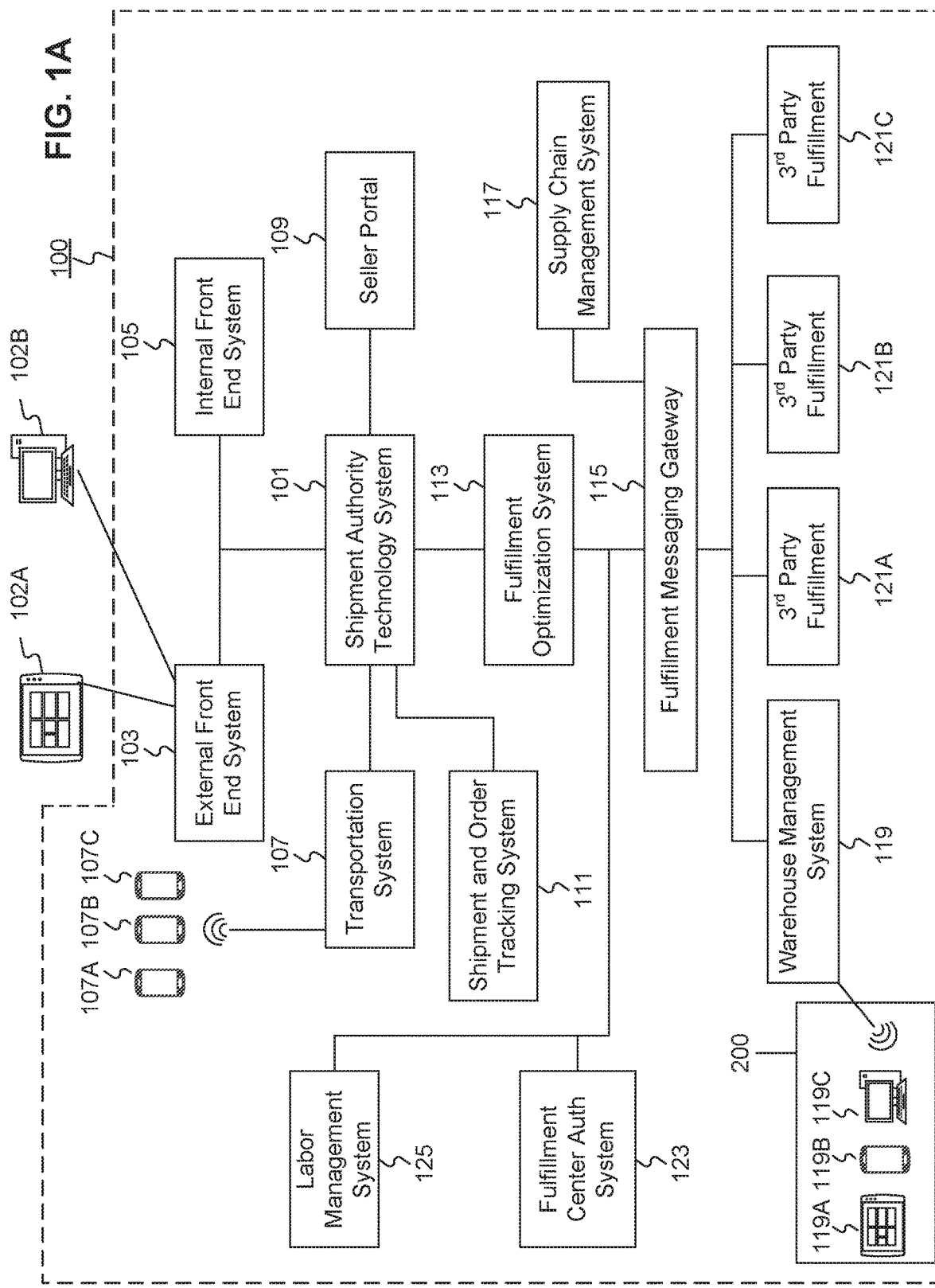
FIG. 1A is a schematic block diagram illustrating an exemplary embodiment of a network comprising computerized systems for communications enabling shipping, transportation, and logistics operations, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computer-implemented systems and methods for optimizing product inventory by rebalancing a quantities of products destined for fulfillment centers. The disclosed embodiments provide innovative technical features that allow for automated inventory rebalancing by leveraging SKU based inventory management technology and network infrastructure to dynamically rebalance an order quantity to achieve optimal inventory level, taking into account real-time business information and constraints. For example, the disclosed embodiments enable efficient assignment of inventory level for a product across a network of fulfillment centers, re-outing of incoming shipment of the product to a specific fulfillment center (FC), and adjusting order quantity for restocking orders.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
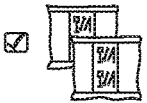
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
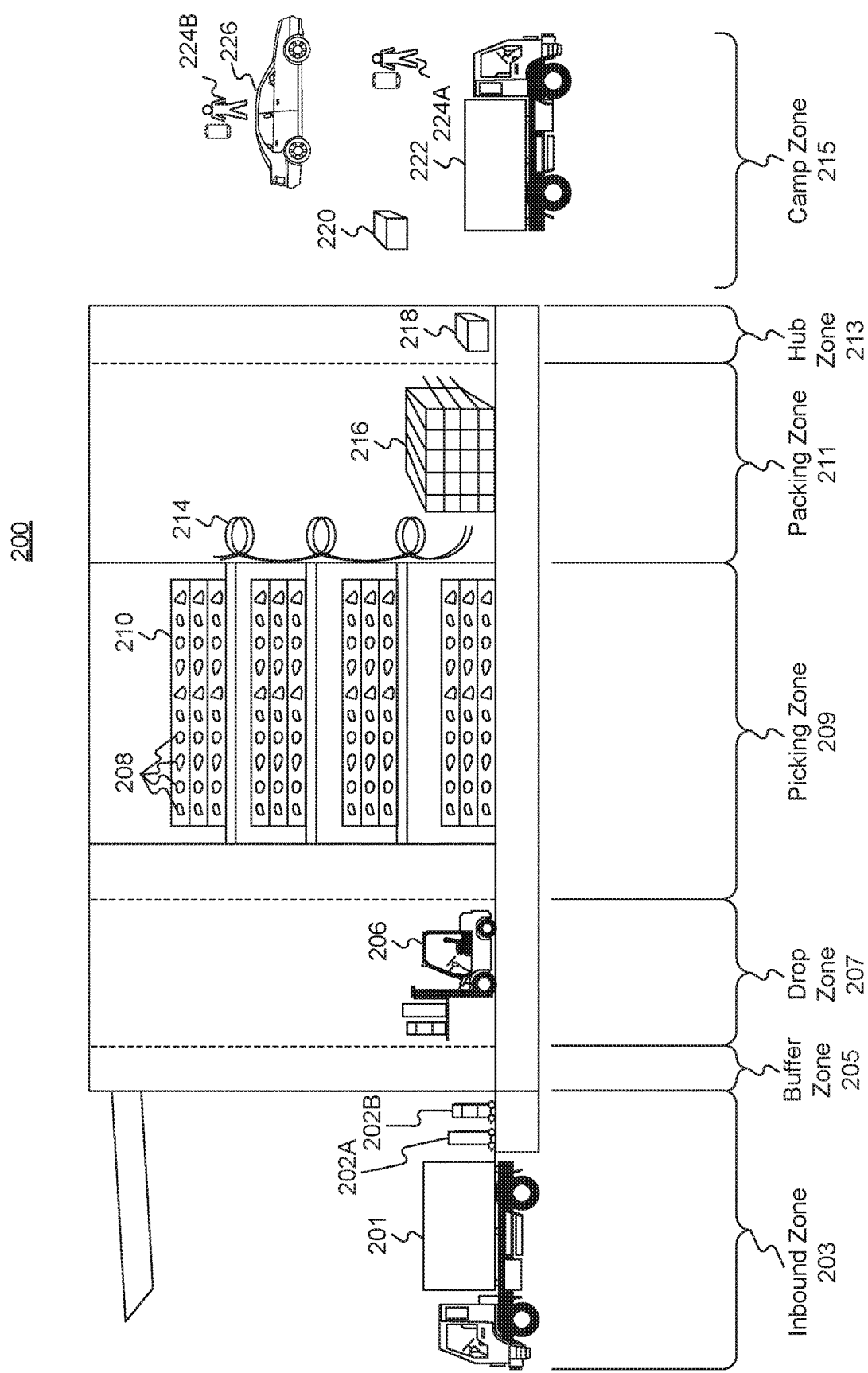
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
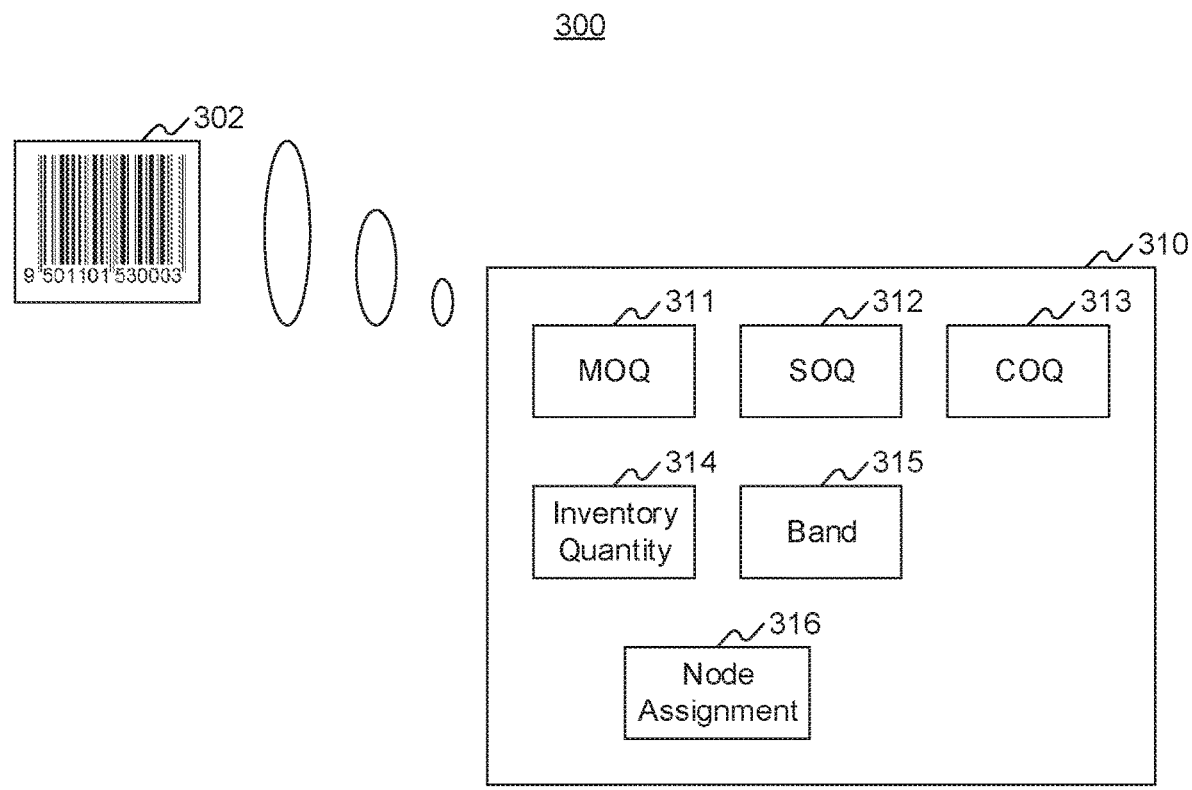
FIG. 3 is a schematic block diagram illustrating an exemplary embodiment of a product attribute corresponding to a storage keeping unit (SKU), consistent with the disclosed embodiments.

FIG. 3 is a schematic block diagram illustrating an exemplary embodiment a product attribute corresponding to a storage (or stock) keeping unit (SKU), consistent with the disclosed embodiments. Product attribute may contain information regarding a particular product, which may include, but not limited to manufacturer, description, material, size, color, packaging, quantity in inventory, quantity ordered, demand level (e.g., velocity), expiration, etc. In some embodiments, a SKU 300 is associated with product attribute 310 and barcode 302, barcode 302 being linked to product attribute 310. Barcode 302 may be placed on the product itself, on the product's packaging, or on tags or attachment affixed to the product or its packaging. Barcode 302 is configured to be readable or scannable by a barcode reader or scanner, not illustrated. In some embodiments, mobile devices 107A-C may possess imaging components such as a camera, and therefore may function as barcode readers or scanners. An ordinary skilled person will appreciate that barcode 302 is a non-limiting example of an automatic identification and data capture (AIDC) scheme that may be implemented consistent with the disclosure embodiments. For example, instead of, or in addition to a barcode, SKU 300 may be linked to a QR code, a RFID tag, magnetic strip or any other AIDC.

Product attribute 310, which is associated with SKU 300, is linked to barcode 302. Product attribute 310 may be stored in databases and be manipulated by any computer systems. In the exemplary embodiment, product attribute 310 is stored in FO system 113, and may be accessed by any of the interconnected systems illustrated in FIG. 1A. For example, a worker using a mobile device 107A may access product attribute 310 by scanning barcode 302, or other input means, and obtain product information associated with SKU 300. Similarly, the worker may edit or update product information when, for example, a quantity of the product is delivered or received. Additionally, or alternatively, product attribute 310 may be accessed by SOT system 111, transportation system 107, SCM system 117 or other systems as whenever the product information is needed or updated.

In the exemplary embodiment, product attribute 310 comprises at least data regarding a minimum reorder quantity (MOQ) 311, a safety reorder quantity (SOQ) 312, a cycle reorder quantity (COQ) 313, an inventory quantity 314, a product band (Band) 315, and a node assignment 316 of the particular product. One of ordinary skill will appreciate that the data listed herein are non-limiting, and product attribute 310 may contain other data concerning the particular product.

MOQ 311 represents a fixed quantity of the particular product that is ordered whenever a fulfillment center (FC) restocks the particular product. For example, if a FC replenishes its stock of widget A, the restocking order must contain an amount of widget A greater than or equal to MOQ 311.

SOQ 312 represents a quantity of the particular product that should be ordered, for a specific FC, such that its inventory quantity 314 is kept above a desired number. For example, if a FC replenishes its stock of widget A, the restocking order should contain an amount of widget A greater than or equal to SOQ 312 for widget A, such that the specific FC will be sufficiently stocked with widget A before the next replenishment.

COQ 313 represents a quantity of the particular product that could be ordered, for a specific FC, for any business reasons. For example, if a FC replenishes its stock of widget A, the restocking order could contain an amount of widget equal to COQ 313. COQ 313 may be adjusted to scale with expected demand or to hedge against price fluctuation, or other business or operational reasons.

Inventory quantity 314 represents a quantity of the particular product that is currently stocked at a specific FC, across the entire network of FCs, or both. For example, inventory quantity 314 may keep tracks of widget A by tracking a quantity of widget A across all FCs, as well as a quantity of widget A in fulfillment center A (FC A), a quantity of widget A in FC B, and so forth.

Band 315 represents one or more groups into which SKU 300 associated with the particular product is assigned. In some embodiments, the grouping may be based on a relative ranking of sales quantity of the particular product. For example, widget A may be assigned to group 1 because widget A is a highly demanded product, while widget B is assigned to group 2 because widget B is in low demand. One of ordinary skill will understand that the embodiments described are non-limiting; for example, widgets may be assigned to more groups. Moreover, other parallel grouping of products may be employed to group and sort products for other reasons.

Node assignment 316 represents rules limiting a quantities of the particular product at a FC. For example, it may be desirable for widget A to be only stocked at designated FCs, or that widget A be prevented from being stocked at designated FCs.

Figure 4:
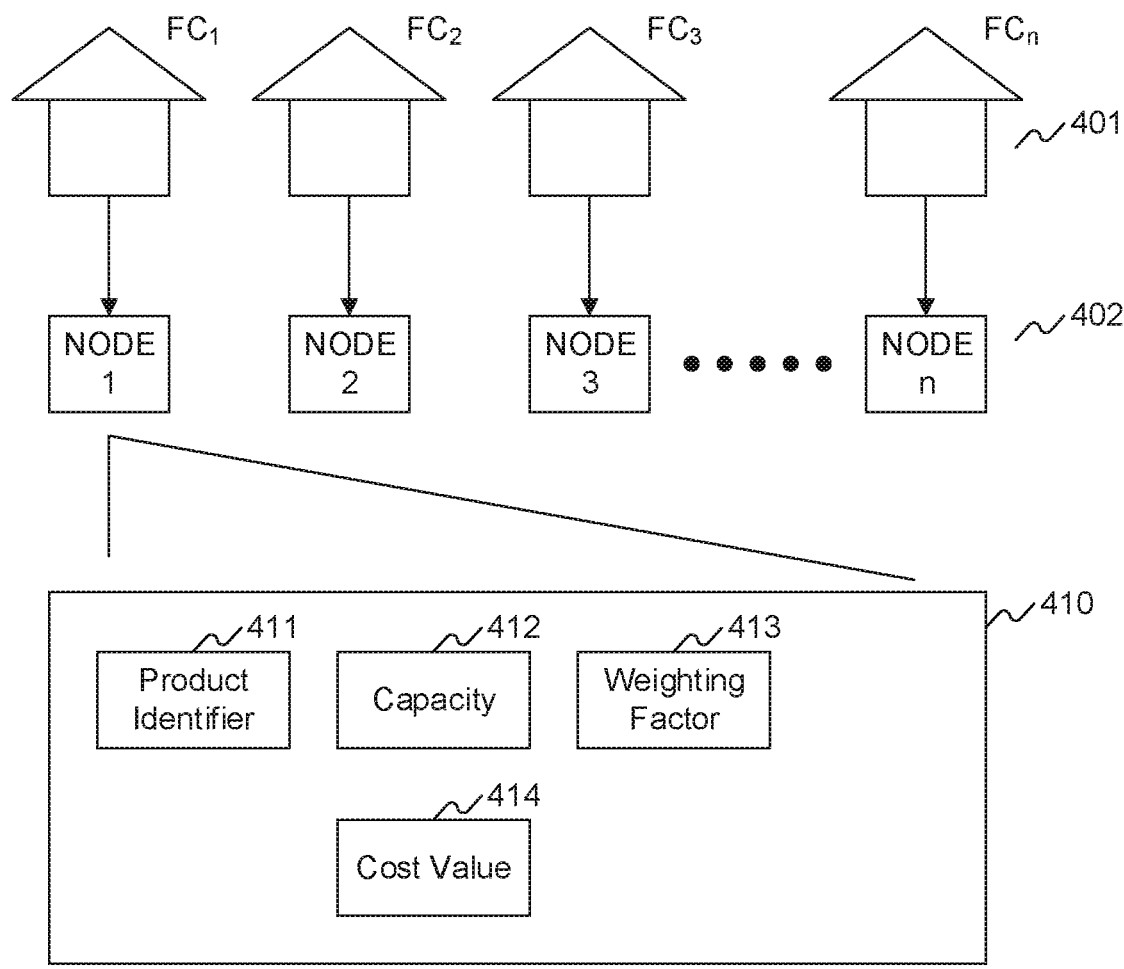
FIG. 4 is a schematic block diagram illustrating an exemplary embodiment of a network of nodes corresponding to a network of Fulfillment Centers (FCs), and an exemplary data node.

FIG. 4 is a schematic block diagram illustrating an exemplary embodiment of a network of nodes corresponding to a network of fulfillment center (FCs), and an individual exemplary data node.

In the exemplary embodiments, a plurality of fulfillment centers (FCs) form a network of fulfilment centers (FC network) 401. In some embodiments, each FC within the FC network may correspond to FC 200 illustrated in FIG. 2, described in detail in previous sections.

In the exemplary embodiments, a plurality of data nodes, hereafter referred to as nodes, forms a network of nodes (node network) 402. The nodes may be a structured in a hub-and-spoke configuration, with every node connected to each other through a central hub. In the exemplary embodiment, each node 410 corresponds to a FC, thus the number of nodes in node network 402 is equal to the number of FCs in FC network 401. For example, Node 1 corresponds to FC1, Node 2 correspond to FC2, and so forth. Node 410 is a data structure that may contain any and all data relating the corresponding FC. In the exemplary embodiment, node 410 comprises at least one or more product identifiers 411 corresponding to one or more products stocked in a FC, capacity 412 of a FC, weighting factor 413 assigned to a FC, and cost value 414 assigned a FC. One of ordinary skill will appreciate that the information contained in node 410 are not limited to the ones listed, and that node 410 may contain other data relating to a FC.

In the exemplary embodiment, node 410 is stored in FO system 113, and may be accessed by any of the interconnected systems illustrated in FIG. 1A. Additionally, or alternatively, node 410 may be accessed by SOT system 111, transportation system 107, SCM system 117 or other systems whenever information regarding a FC is needed or updated.

Product identifiers 411 may be a collection of a plurality of individual SKUs 300 corresponding to the products at are stocked at the specific FC. For example, if 50 different products are stocked at the specific FC, product identifiers 411 will contain 50 individual SKUs 300, as well all information regarding the product that is contained within SKU 300 as illustrated in FIG. 3 and previously described.

Capacity 412 represents a capability of the specific FC to operate. For example, capacity 412 may be a quantity of products that can be stocked by the FC, a quantity of products that can be received by the FC, or a quantity of products that can be delivered from the FC. In some embodiments, capacity 412 of the FC may be limited by availability of total storage space, warehouse workers, delivery workers, delivery vehicles, and so forth. In some embodiments, capacity 412 may be product specific. For example, node 410 may have one capacity for widget A, and a different capability for widget B. One of ordinary skill will appreciate that differences between products, such as ones between toilet papers and TV sets, will result in a FC having different values of capacity 412 for the different products. In some embodiments, the numbers of different capacity values correspond to the numbers of different SKUs 300 in the product identifier 411. In some embodiments, a FC may have height limit due to structural constraint, and would thus have limited capacity to handle oversized products. In some embodiments, a FC may have limited refrigeration capacity, and would thus have limited capacity to handle items that require refrigeration or freezing.

In some embodiments, capacity 412 for a specific FC may be dynamic. For example, capacity 412 for the FC may vary based on a quantity of products currently stocked at the FC. Higher quantity may mean high utilization of storage space, hence a lower value for capacity 412. Additionally, or alternatively, capacity 412 may vary with demand for products. For example, capacity 412 for the FC may vary based on a quantity of product that is predicted to arrive at or leave from the FC. Higher quantity may mean that high utilization of workers and equipment, hence a lower value for capacity 412.

Weighting factor 413 represents a numerical value associated a specific node 410, corresponding to a particular FC. Weighting factor 413 may be calculated using various input values such as capacity 412 and product identifier 411. For example, for each product at each node, an expected utilization may be determined based on a current capacity and an incoming quantity. In some embodiments, the incoming capacity may be one of MOQ 311, SOQ 312, or COQ 313, and the current capacity may be determined by capacity 412. If, for example, the expected utilization is below a threshold value at node 410, weighting factors may be left unchanged (i.e. node 410 will receive the incoming quantity). If, for example, the expected utilization is above the threshold for node 410, weighting factor 413 may be lowered for node 410 such that the product is directed to a different node having the next lowest expected utilization. This may be applicable to products that are always in high demand for all FCs, and thus no re-shuffling is needed even if capacity across the node network 402 may vary. In some embodiments, the threshold value may be related to band 315, and product in high a demand band may be assigned higher threshold value. Additionally or alternatively, if a product is not in high demand, weighting factor 413 may be adjusted so that the product is routed to a different node having the next lowest expected utilization, without regard to the threshold value.

Cost value 414 represents a numerical value associated with a specific node 410, corresponding to a particular FC. Cost value 414 may be obtained from a cost function. In some embodiment, the threshold value used to determine the weighting factor 413 may be the cost value.

Figure 5:
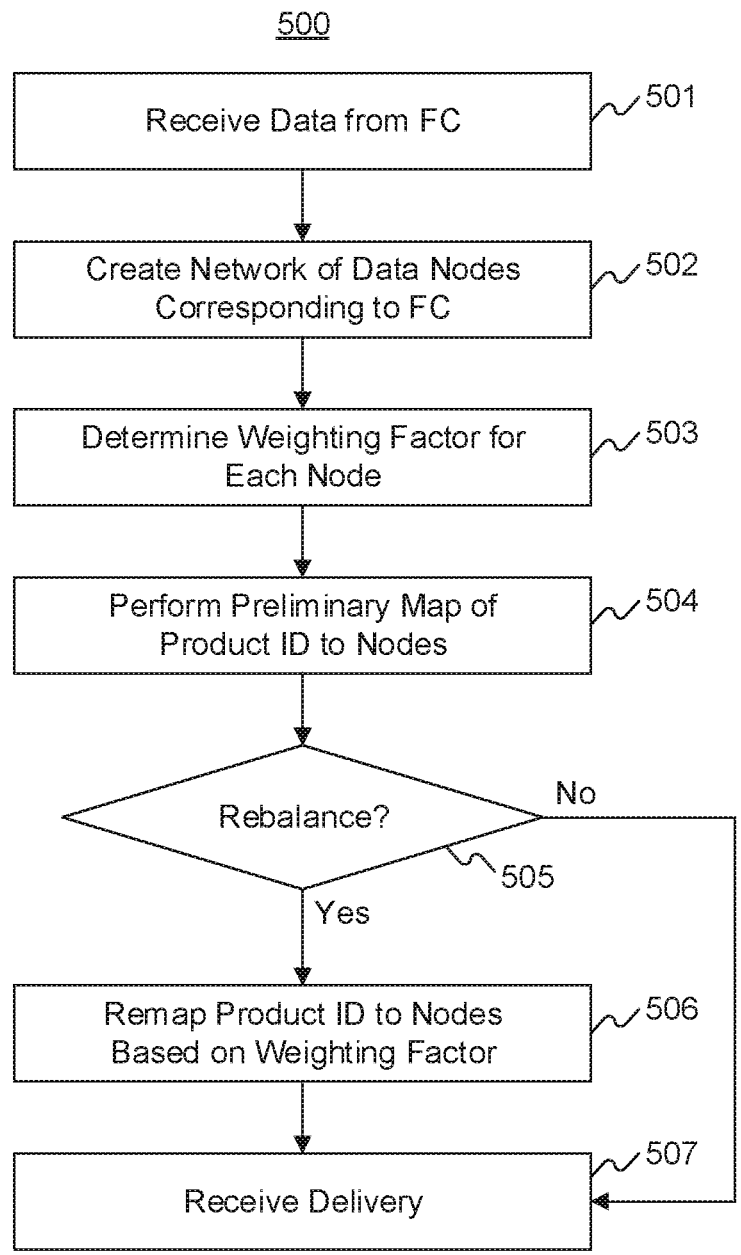
FIG. 5 is flow chart depicting an exemplary embodiment of a process for managing product inventory across a network of FCs, consistent with the disclosed embodiment.

FIG. 5 is flow chart depicting an exemplary embodiment of a process 500 for managing a particular product inventory having an SKUs 300 across a network of FCs, consistent with the disclosed embodiments. In the exemplary embodiment, FO system 113 may carry out process 500. Additionally, or alternatively, SOT system 111, transportation system 107, SCM system 117 and/or other systems illustrated in FIG. 1A may carry out all or part of process 500.

In step 501, FO system 113 receive data relating to a plurality of FCs 200. In some embodiments, FO system 113 may obtain pre-existing data from known databases. These pre-existing data may be stored in FO system 113, SOT system 111, transportation system 107, SCM system 117 or other systems or databases connected to FO system 113. These pre-existing data may contain information such as inventory of product stocked in each FC 200, SKU 300 associated with the inventory of products, number of workers and equipment, or other similarly relevant information. In some embodiments, data relating to a plurality of FCs 200 may be accessed from SKU 300. For example, by accessing SKUs 300, FO system 113 may obtain, for different products, values such as MOQ 311, SOQ 312, COQ 313, inventory quantity 314, band 315 and node assignment 316.

In step 502, from these obtained pre-existing data, FO system 113 may create node network 402, comprising a plurality of nodes 410, each corresponding to a specific FC 200. Alternatively, node network 402 may already exist within FO system 113, and only updates of relevant data is needed in step 502. Additionally or alternatively, in step 502, FO system 113 may create a new node within node network 402 if a new FC is established. Similarly, FO system 113 may delete a node from node network 402 if an existing FC is decommissioned.

In step 503, FO system 113 determines weighting factor 413 for each node 410. Weighting factor 413 is determined based on capacity 412 and inventory quantity of the particular product. In some embodiment, capacity 412 comprises an inbound capacity. The inbound capacity represents the ability of the specific FC 200 to receive the particular product, measured in quantity of product. The inbound capacity may be limited by the number of workers or equipment available to unload and stock the product, or inbound labor capacity. The inbound capacity of a product may be affected by the inbound capacity of another product, as the two products may compete with each other for the same labor hour. In some embodiments, the inbound capacity may also depend on the total storage space of the specific FC for the particular product, or inbound space capacity, so the inbound capacity may be the minimum of the inbound labor capacity and the inbound storage capacity.

In some embodiments, weighting factor 413 may be determined by scaling a value determined by a difference between the inbound capacity and the inventory level for the particular product, such that a FC having a higher inbound capacity and a lower inventory quantity would have a higher weight factor. For example, if FC1 and FC2 both have a inbound capacity of receiving 1000 unit of widget A each, but FC1 has an inventory of 0 widget A in stock, while FC2 has an inventory of 500 widget A in stock, FC1 would have a higher weighting factor than FC2 since the difference between the inbound capacity and the inventory level is greater for FC1 than for FC2.

In step 504, FO system 113 performs a preliminary mapping of each SKU 300 to each node 410. For example, FO system 113 directs restocking orders of each product to individual FCs. FO system 113 may contain a set of rules governing mapping of each SKU 300 to each node 410. The rules may be extensive and takes into account many properties of products and FCs. For example, during preliminary mapping, MOQ 311, SOQ 312, or COQ 313 may be calculated for every node in node network 402 to maintain enough inventory until the next ordering cycle.

In some embodiments, rules for preliminary mapping comprises determining values of SOQ 312 and COQ 313, based on values of MOQ 311, for each node 410 in node network 402. In the exemplary embodiments, MOQ 311 is generally fixed for a particular product, since it may represents a minimum quantity for bulk order. MOQ 311 is generally constrained by outside factors and cannot be easily adjusted. Therefore, it may not be possible to stock the particular product to an exact unit number desired. In some embodiments, SOQ 312 is determined by historical data. For example, widget A may have an order cycle of 2 weeks, and FC1 has historically delivered on average 100 units of widget A during any 2 week period. Thus FO system 113 may determine that SOQ 312 of widget A for FC1 should be around 100. Similarly, FO system 113 may determine COQ 313 based on historical data. For example, FO system 113 may determine that during particular times in a year, FC1 delivers 150 widget A. Thus FO system 113 may determine that COQ 313 should be 50 for that particular time of year. These historical data may be stored on or retrieved from any one of the systems illustrated in FIG. 1A, such as SOT system 111, transportation system 107, FO system 113 or SCM system 117. Taking into account SOQ 312, COQ 313, and MOQ 311, FO system 113 directs restocking orders of the particular product (i.e. maps SKU 300) to the individual FC 200.

In step 505, FO system 113 makes a determination on whether a rebalancing of the inventory is required for a particular product. In some embodiments, FO system 113 makes this determination based on band 315 associated with SKU 300 of the particular product, which will be described in further detail below with reference to FIG. 6. Additionally, or alternatively, FO system 113 may make this determination based on node assignment 316 of SKU 300 associated with the particular product. For example, if node assignment 316 designate that the particular product is only stocked at a specific FC, then there is no need to rebalance the inventory of the product among other FCs.

If FO system 113 determines that a rebalancing is required, FO system 113 remaps SKUs 300 to nodes 410 in step 506, based on weighting factor 413 for the individual nodes across the entire node network 402. The re-mapping is similar to step 504, but with the additional consideration of weighting factor 413. For example, using weighting factors calculated in step 503, if FO system 113 determines that for a particular product, FC1 has a greater weighting factor value then FC2, FO system 113 would calculate a rebalanced value of SOQ 312, COQ 313, or both, for FC1 and FC2. The rebalanced values are such that for FC1, the rebalanced values of SOQ 312 or COQ 313 would be greater than values of SOQ 312 or COQ 313 initially calculated in step 504. Similarly, the rebalanced values are such that for FC2, the rebalanced values of SOQ 312 or COQ 313 would be less than values of SOQ 312 or COQ 313 initially calculated in step 504. Thus, the quantity of restocking order would be adjusted higher for FCs with higher capacity in relations to inventory level for a particular product, and adjusted lower for FCs with lower capacity in relations to inventory level. One of ordinary skill will appreciate that the example given is non-limiting, and that other factors are taken into consideration, such as the various rules described in step 504.

Once remapping is completed in step 506, or if FO system 113 determines that rebalancing is not required, FO system 113 executes the mapping, and the orders for stocking of products at FCs are carried out in step 507.

In some alternative embodiments, in additions to calculating and assigning a weighting factor 413, FO system 113 calculate cost value 414 associated with a specific FC across the node network 402 for a particular product. For example, in step 503, cost values 414 may be calculated and assigned to individual nodes 410 in addition to weighting factor 413.

In some alternative embodiments of step 503, FO system 113 receives capacity 412 for node 410 associated with a specific FC 200. As previously discussed, capacity 412 may comprise an inbound capacity for the specific FC. Capacity 412 may further comprise a total capacity. FO system 113 determines a FC utilization value based on the ratio of the inbound capacity and the total capacity for the FC. FO system 113 also receives an inbound order quantity in step 503. The inbound order quantity is total quantity of a particular product (associated with SKU 300) that is due to arrive across the entire node network 402. FO system 113 also receives a reorder quantity of the particular product (associated with SKU 300) for a specific node 410 in node network 402. In some embodiments, the reorder quantity may be the sum of SOQ 312 and COQ 313. As discussed above, values of SOQ 312 and COQ 313 may be based on historical values or projections.

FO system 113 may calculate cost value 414 based on an inventory factor and a FC utilization factor. In some embodiments, FO system 113 derives the inventory factor based on a quantity of SKU present at FC ($Inv_{FC}$), a quantity of SKU assigned to FC ($Inv_{AS}$) by system 113, a total quantity of SKU ($Inv_{TO}$) across node network 402, and the reorder quantity (ROQ). In some embodiments, the inventory factor may be given as:

$$C_1 \frac{Inv_{FC} + Inv_{AS}}{Inv_{TO} + ROQ}$$

$C_1$ being the first scaling factor. In some embodiments, FO system 113 derives the FC utilization factor by scaling the FC utilization value ($Utili_{FC}$) by a second scaling factor $C_2$. In some embodiments, cost value 414 may be the sum of the inventory factor and the FC utilization factor, given as:

$$\text{Cost Value} = C_1 \frac{Inv_{FC} + Inv_{AS}}{Inv_{TO} + ROQ} + C_2 \cdot Utili_{FC}$$

In some embodiments, the first scaling factor and the second scaling factor may be adjusted from time to time to achieve a cost value 414 that optimize inventory shuffling across FCs. One of ordinary skill will appreciate that cost value 414 obtained will be lower for FCs with high reorder quantity and low FC utilization value, thus it may be advantageous to direct a higher quantity of the particular product to FCs with lower cost value 414. FO system 113 assigns cost value 414 to individual node 410 in alternative step 503.

In some alternative embodiments of step 506, FO system 113 remaps SKUs 300 to nodes 410 based on cost value 414 for the individual nodes across the entire node network 402.

Figure 6:
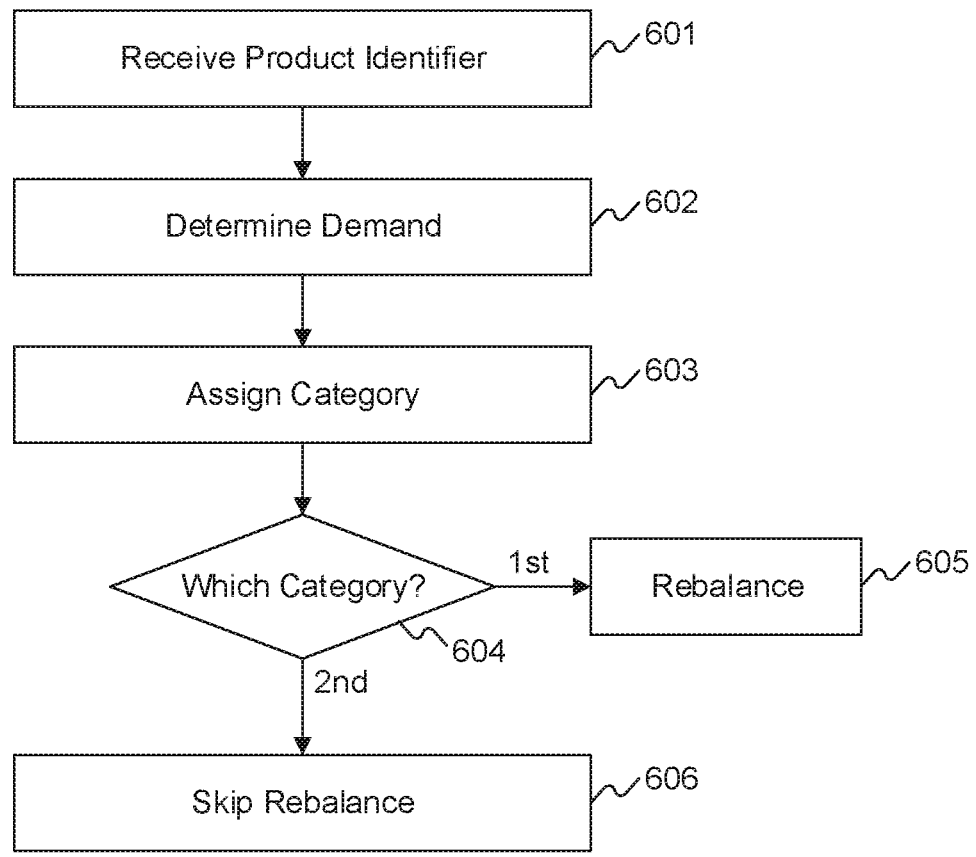
FIG. 6 is a flow chart depicting an exemplary embodiment of a process for rebalancing inventory for FCs based on product identifier.

FIG. 6 is a flow chart depicting an exemplary embodiment of a process for rebalancing inventory for FCs based on product attribute 310 of a particular product. In some embodiment, product attribute 310 is associated SKU 300. Process 600 corresponds to step 505 of process 500. Process 600 categorizes products based on product attribute 310 associated with SKU 300. FO system 113 determines a priority for rebalancing inventory based on the category of the products.

In step 601, FO system 113 receives SKU 300 associated with the particular product. As previously discussed, SKU 300 contains data such as Inventory Quantity 314 and Band 315.

In step 602, FO system 113 determines a demand for the product. The demand for the product can be determined based on band 315. For example, products in the system may be sorted based on total quantity delivered. This sorting may be performed by FO system 113, SOT system 111, transportation system 107, SCM system 117 or other systems illustrated in FIG. 1A. Based on the sorting, products and their associated SKUs 300 may be assigned into different bands, such as $Band_1$, $Band_2$ ... $Band_n$. Band 315 identifies which band SKU 300 belongs to. In some embodiments, the number of bands may be arbitrary and can be altered as needed. For example, the top 20% of products delivered may be placed in Band1, the next 20% in Band2, and so forth.

In step 603, FO system 113 assign SKU 300 of the particular product into categories. In some embodiments, the categories are 1) Rebalance Needed, and 2) Rebalance Unneeded. The assignment of categories may be based on band 315 of SKU 300. For example, FO system 113 may determine that only highly demanded products require inventory rebalancing. Therefore, the only products having band 315 that falls within $Band_1$ is assigned to the Rebalance Needed category, while all other SKUs are assigned to the Rebalance Unneeded category. Alternatively, in another non-limiting example, if only very low demand products are exempted from inventory rebalancing, then FO system 113 assigns products having band 315 that falls within $Band_1$, $Band_2$, $Band_3$, or $Band_4$ to Rebalance Needed category, while only $Band_5$ is assigned Rebalance Unneeded category. One of ordinary skill will appreciate that the number of bands, criteria for each band, and threshold for the categories described above are mere illustrative examples, and these values can be adjusted based on needs that arise.

In step 604, FO system 113 checks SKU 300 associated with the particular product for which category the product has been assigned. If the category is 1, FO system 113 proceeds to step 605, which corresponds to "YES" designation in step 505. If the category is 2, FO system 113 proceeds to step 606, which corresponds to "NO" designation in step 505.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for automated inventory shuffling, comprising:
at least one processor;
a memory comprising instructions that, when executed by the at least one processor, performs steps comprising:
receive information comprising data regarding a network of a plurality of fulfillment centers (FCs) in one format or protocol, the data comprising a capacity of each FC;
convert the received information into another format or protocol;
based on the converted information, initialize a data structure comprising a plurality of nodes, the plurality of nodes corresponding to the plurality of FCs;
determine, based on the capacity of each FC, a weighting factor associated with each FC relative to the received FC capacities, wherein the weighting factor is associated with an inbound capacity of the respective FC and an inventory level in the respective FC;
receive, for assignment to one or more FCs, a product identifier associated with a product, the identifier associated with a first quantity and a minimum order quantity, wherein the product identifiers are divided into one or more categories by:
receiving information associated with a plurality of product identifiers, the information comprising demand of each product identifier;
assigning a plurality of subsets of the product identifiers with highest demand forecast quantities to a first set of categories; and
assigning the remaining subsets of the product identifiers with the next highest demand forecast quantities to a second set of categories;
perform a preliminary mapping of the first quantity to the plurality of FCs based on the associated minimum order quantity;
determine a category associated with the product identifier;
based on determining that the product identifier is associated with the first set of categories, rebalance the preliminary mapping of the first quantity, wherein rebalancing the preliminary mapping comprises:
adjusting the data structure comprising the plurality of nodes to reassign the first quantity to the plurality of FCs based on the weighting factor associated with each of the plurality of FCs;
receive data associated with a second quantity to be delivered to the network of the plurality of FCs in one format or protocol;
convert the received data into another format or protocol; and
based on the converted data and the rebalanced preliminary mapping, cause the second quantity to be delivered to the network of the plurality of FCs.

2. The computer-implemented system of claim 1, wherein:
the first quantity comprises at least a safety reorder quantity and a cycle reorder quantity; and
rebalancing the preliminary mapping of the first quantity further comprises rebalancing the safety reorder quantity across the network of the plurality of FCs.

3. The computer-implemented system of claim 1, wherein:
the first quantity comprises at least a safety reorder quantity and a band associated with relative ranking of sales quantity; and
rebalancing the preliminary mapping of the first quantity further comprises rebalancing the safety reorder quantity across the network of the plurality of FCs.

4. The computer-implemented system of claim 1, wherein:
the number of nodes is equal to the number of FCs.

5. The computer-implemented system of claim 1, wherein the first quantity of the product identifier comprises at least one of a sum of demand forecast quantities for the product over a first period of time and a sum of safety stock quantities for the product over a second period of time.

6. The computer-implemented system of claim 1, wherein the first quantity of the product identifier is determined based on a number of incoming orders for the associated product.

7. The computer-implemented system of claim 2, wherein the cycle reorder quantity is adjusted with expected demand.

8. The computer-implemented system of claim 1, wherein rebalancing the preliminary mapping further comprises evaluating a cost function for each FC.

9. The computer-implemented system of claim 8, wherein the cost function comprises determining a cost value for each FC based on the first quantity associated with the product identifier, a reorder quantity associated with the product identifier, and an FC utilization value.

10. The computer-implemented system of claim 9, wherein the steps further comprise assigning a higher proportion of the first quantity to an FC having a lowest associated cost value.

11. A computer-implemented method for inventory shuffling, the method being performed by at least one processor executing stored instructions to perform steps comprising:
receiving information comprising data regarding a network of a plurality of fulfillment centers (FCs) in one format or protocol, the data comprising a capacity of each FC;
converting the received information into another format or protocol;
based on the converted information, initializing a data structure comprising a plurality of nodes, the plurality of nodes corresponding to the plurality of FCs;
determining, based on the capacity of each FC, a weighting factor associated with each FC relative to the received FC capacities, wherein the weighting factor is associated with an inbound capacity of the respective FC and an inventory level in the respective FC;
receiving, for assignment to one or more FCs, a product identifier associated with a product, the identifier associated with a first quantity and a minimum order quantity, wherein the product identifiers are divided into one or more categories by:
receiving information associated with a plurality of product identifiers, the information comprising demand of each product identifier;
assigning a plurality of subsets of the product identifiers with highest demand forecast quantities to a first set of categories; and
assigning the remaining subsets of the product identifiers with the next highest demand forecast quantities to a second set of categories; and
performing a preliminary mapping of the first quantity to the plurality of FCs based on the associated minimum order quantity;
determining a category associated with the product identifier;
based on determining that the product identifier is associated with the first set of categories, rebalancing the preliminary mapping of the first quantity, wherein rebalancing the preliminary mapping comprises:
adjusting the data structure comprising the plurality of nodes to reassign the first quantity to the plurality of FCs based on the weighting factor associated with each of the plurality of FCs;
receiving data associated with a second quantity to be delivered to the network of the plurality of FCs in one format or protocol;
converting the received data into another format or protocol; and
based on the converted data and the rebalanced preliminary mapping, causing the second quantity to be delivered to the network of the plurality of FCs.

12. The computer-implemented method of claim 11, wherein:
the first quantity comprises at least a safety reorder quantity and a cycle reorder quantity; and
rebalancing the preliminary mapping of the first quantity further comprises rebalancing the safety reorder quantity across the network of the plurality of FCs.

13. The computer-implemented method of claim 11, wherein:
the first quantity comprises at least a safety reorder quantity and a band associated with relative ranking of sales quantity; and
rebalancing the preliminary mapping of the first quantity further comprises rebalancing the safety reorder quantity across the network of the plurality of FCs.

14. The computer-implemented method of claim 11, wherein:
the number of nodes is equal to the number of FCs.

15. The computer-implemented method of claim 11, wherein the first quantity of the product identifier comprises at least one of a sum of demand forecast quantities for the product over a first period of time and a sum of safety stock quantities for the product over a second period of time.

16. The computer-implemented method of claim 11, wherein the first quantity of the product identifier is determined based on a number of incoming orders for the associated product.

17. The computer-implemented method of claim 12, wherein the cycle reorder quantity is adjusted with expected demand.

18. The computer-implemented method of claim 11, wherein rebalancing the preliminary mapping further comprises evaluating a cost function for each FC.

19. The computer-implemented method of claim 18, wherein the steps further comprise assigning a higher proportion of the first quantity to an FC having a lowest associated cost value.

20. A computer-implemented method inventory shuffling, the method being performed by at least one processor of a networked server executing stored instructions to perform steps comprising:
  receiving information comprising data regarding a network of a plurality of fulfillment centers (FCs) in one format or protocol, the data comprising an inbound capacity and a total capacity of each FC;
  converting the received information into another format or protocol;
  based on the converted information, initializing a data structure comprising a plurality of nodes, the plurality of nodes corresponding to the plurality of FCs, wherein the number of nodes is equal to the number of FCs;
  determining, based on a ratio of the inbound capacity and the total capacity, a utilization value for each FC;
  receiving, for assignment to one or more FCs, a product identifier associated with a product, the identifier associated with a first quantity and a minimum order quantity, wherein the product identifiers are divided into one or more categories by:
    receiving information associated with a plurality of product identifiers with highest demand forecast quantities to a first set of categories and;
    assigning the remaining subsets of the product identifiers with the next highest demand forecast quantities to a second set of categories and;
  performing a preliminary mapping of the first quantity to the plurality of FCs based on the associated minimum order quantity;
  determining a category associated with the product identifier;
  based on determining that the product identifier is associated with a first set of categories, rebalancing the preliminary mapping of the first quantity based on the utilization value associated with each FC, wherein rebalancing the preliminary mapping comprises:
    evaluating a cost function for each FC; and
    adjusting the data structure comprising the plurality of nodes to reassign the first quantity to the plurality of FCs based on the weighting factor associated with each of the plurality of FCs and the cost function for each FC;
  receiving data associated with a second quantity to be delivered to the network of the plurality of FCs in one format or protocol;
  converting the received data into another format or protocol; and
  based on the converted data and the rebalanced preliminary mapping, causing a second quantity to be delivered to the network of the plurality of FCs.

* * * * *